United States Patent [19]
Bennett

[11] Patent Number: 5,612,949
[45] Date of Patent: Mar. 18, 1997

[54] METHOD AND APPARATUS FOR DETERMINING NETWORK DELAYS

[75] Inventor: Steven N. Bennett, Cheltenham, United Kingdom

[73] Assignee: Hewlett-Packard Company, Palo Alto, Calif.

[21] Appl. No.: 435,551

[22] Filed: May 5, 1995

[30] Foreign Application Priority Data

Jun. 13, 1994 [EP] European Pat. Off. .............. 94304256

[51] Int. Cl.$^6$ .................................................. H04B 17/00
[52] U.S. Cl. .......................................... 370/253; 370/522
[58] Field of Search ................................. 370/13–14, 17, 370/60, 84, 85.1, 85.13, 15.3, 94.1, 110.1, 82, 105.1; 340/825.65, 826.01, 826.02, 825.06, 825.51, 825.52; 348/180, 184, 192; 375/213, 224; 379/1, 6, 9, 12, 13, 22, 23

[56] References Cited

U.S. PATENT DOCUMENTS

| | | | |
|---|---|---|---|
| 5,095,444 | 3/1992 | Motles | 370/13 |
| 5,193,151 | 3/1993 | Jain | 370/60 |
| 5,315,580 | 5/1994 | Phaal | 370/13 |
| 5,450,394 | 9/1995 | Gruber et al. | 370/17 |

FOREIGN PATENT DOCUMENTS

| | | |
|---|---|---|
| A0415843 | 3/1991 | European Pat. Off. . |
| A0477448 | 6/1992 | European Pat. Off. . |

OTHER PUBLICATIONS

Software Practice & Experience, vo. 16, No. 7, Jul. 1986, Chichester GB pp. 671–687 S. Vassiliades et al. 'A monitor tool on a network based on the Cambridge Ring'.
IEEE Network: The Magazine of Computer Communications, vol. 1, No. 3, Jul. 1987, New York US pp. 13–19.
EPO Search Report.

*Primary Examiner*—Benedict V. Safourek
*Assistant Examiner*—Ricky Q. Ngo

[57] ABSTRACT

A method is disclosed for determining delays in a network (10) carrying messages, such as an SS7 signalling network or a TCP/IP network. The method involves monitoring the network (10) at a predetermined location to detect first messages (REQ) and second messages (ACK) of respective predetermined categories (X, Y), the first and second messages each producing a respective time-dependent loading of the network and the second messages being caused by the first messages whereby the loadings vary in a similar manner with time but with the loading produced by the second messages being offset from that produced by the first messages. Load measures ($L_X, L_Y$) are then derived for the first and second messages (REQ, ACK), each load measure being derived by counting the number of messages of the category concerned that are detected in a predetermined time interval. These load measures ($L_X, L_Y$) are thereafter used to determine the offset between the network loadings produced by the first and second messages, this offset providing a network-delay measurement.

15 Claims, 4 Drawing Sheets

METHOD AND APPARATUS FOR DETERMINING NETWORK DELAYS

FIELD OF THE INVENTION

The present invention relates to a method and apparatus for determining delays in a network carrying messages between entities connected to the network; the invention is applicable, without limitation, to telecommunication signalling networks such as CCITT (now known as ITUTS) SS7 networks, as well as to networks using protocols such as TCP/IP.

DISCUSSION OF THE PRIOR ART

The continuous monitoring of the health of a network is essential for providing a high quality service to network users.

To determine the behaviour of a data network and its elements, measurements of both traffic loading and network delays are generally required—that is, how much traffic is being carried and how long is it taking to get from source to destination. To determine the loading of a network, a load measure can be made by counting the various types of messages present on the network in a given time interval. To measure delays in the network, time intervals between network events can be measured.

Making counts of all message types at all points in a large distributed network requires intense computation and communication activity due to the amount of data involved and the need to transport it to the network operator. To facilitate this task, the Applicants have developed a sampling technique (see EP-B-0.477.448) which vastly reduces the size and complexity of the monitoring system needed to achieve accurate load measurements network wide, allowing a scalable architecture to be defined.

Making time delay measurements for all possible services at all points in a network is computationally more difficult and intense than for load measurements. The random method associated with the above-mentioned sampling technique for load measurements prevents its direct use in obtaining measurements of time intervals.

A possible solution to reduce the additional size and complexity of the monitoring system needed to provide delay measurements would be to make measurements on a non-continuous basis. However, this method would still require significant increased functionality and architectural changes.

An object of the present invention is to provide a method and apparatus for determining network delays that can, where appropriate, be used to effect continuous monitoring of network delays and does not require the direct correlation of the individual parts of the same transaction.

SUMMARY OF THE INVENTION

According to one aspect of the present invention, there is provided a method of determining delays in a network carrying messages between entities connected to the network, these messages including first messages and second messages of respective predetermined categories, the first and second messages each producing a respective time-dependent loading of the network and the second messages being caused by the first messages whereby the loadings vary in a similar manner with time but with the loading produced by the second messages being offset from that produced by the first messages; the method comprising the steps of:

(a) deriving network load measures for the first and second messages at a predetermined location in the network, each load measure being derived by counting at said location the number of messages of the category concerned occurring in a predetermined time interval; and (b) utilising the load measures to determine the offset between the network loadings produced by the first and second messages, this offset providing a network-delay measurement at said predetermined location.

The first messages may be independently generated by an entity connected to the network or may be deliberately injected into the network as part of the delay-determining method; in the former case, step (a) will involve monitoring the network to detect both said first and second messages, whereas in the latter case, step (a) involves counting the number of first messages injected into the network and monitoring the network to detect the number of second messages produced in response to the injected first messages.

Preferably, step (a) involves deriving first and second load measures $L_{X1}$, $L_{X2}$ for the first messages respectively at first and second times separated by a time interval D, and deriving a load measure $L_{Y2}$ for the second messages at said second time; step (b) involving determining said offset according to the following formula:

$$\text{Offset} = D(L_{X2} - L_{Y2})/(L_{X2} - L_{X1})$$

If load measures can be taken for the second messages at intervals that are small relative to the offset size, then the offset can be determined more directly than by using the above formula. In this case, step (a) involves deriving a said load measure for the first messages at a start time, and thereafter deriving a series of load measures for said second messages; step (b) then involves determining an end time when the loading produced by the second messages as determined from the load measures derived in respect thereof, corresponds to the loading produced by the first messages at said start time as indicated by the load measure taken for the first messages at the start time. The offset is thereafter determined by calculating the time interval between the start and end times.

Generally, the messages include message type information and addressing information and the categories of the first and second messages are characterised by this message type and addressing information. Furthermore, typically the load measures derived in step (a) for the first and second messages will be repeatedly derived and the offset will be determined in step (b) at regular intervals from the most recent load measures.

The derivation in step (a) of each said load measure can be effected by counting the number of messages of the category concerned occurring on the network in a fixed update interval with load measures for messages of the same category being carried out over non-overlapping intervals. Alternatively, a sliding window approach can be used; in this case, each load measure is derived by counting the number of messages of the category concerned occurring on the network in a fixed measurement window with successive load measures for messages of the same category being determined at fixed update intervals less than said measurement window.

Preferably, the load measures derived in step (a) are derived at the predetermined location and then communicated to a remote management station where step (b) is performed.

According to another aspect of the present invention, there is provided apparatus for determining delays in a network carrying messages between entities connected to the network, these messages including first messages and second messages of respective predetermined categories, the first and second messages each producing a respective time-dependent loading of the network and the second messages being caused by the first messages whereby the loadings vary in a similar manner with time but with the loading produced by the second messages being offset from that produced by the first messages; the apparatus comprising:

load measuring means for deriving load measures for the first and second messages at a predetermined location in the network, each load measure being derived by counting the number of messages of the category concerned occurring in a predetermined time interval; and offset determining means for utilising the load measures to determine the offset between the network loadings produced by the first and second messages, this offset providing a network-delay measurement at said predetermined location.

Preferably, the load measuring means are incorporated into a network monitoring probe intended to be disposed at the predetermined location, the load measuring means being operative to determine load measures for the first and second messages at regular intervals and the monitor probe including reporting means for reporting the load measures to a remote management station comprising the offset determining means.

BRIEF DESCRIPTION OF THE DRAWINGS

A method of determining network delays according to the invention, and apparatus for implementing this method, will now be particularly described by way of non-limiting example, with reference to the accompanying diagrammatic drawing, in which.

DESCRIPTION OF THE PREFERRED EMBODIMENT

Figure 1:
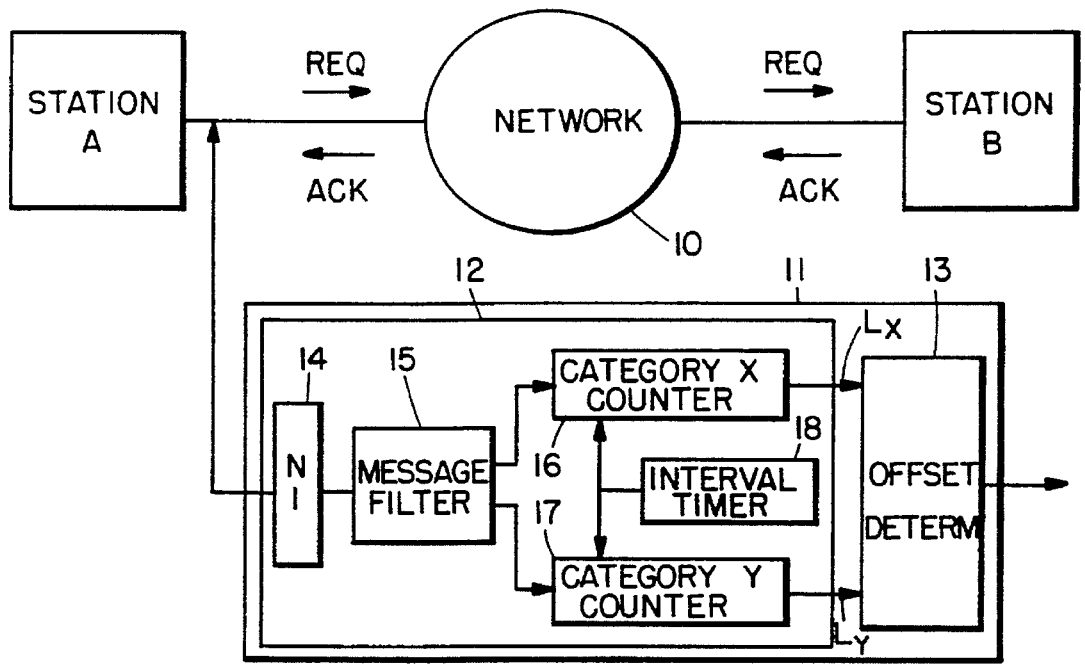
FIG. 1 is a diagram of the delay-determining apparatus connected to monitor the delay between stations A and B across a network.

FIG. 1 shows two stations A and B which can communicate with each other over a network 10 by sending and receiving messages. These messages will generally contain source and destination addressing information as well as message type information. In FIG. 1, station A is shown as sending request messages "REQ" to station B which responds by returning an acknowledgement message "ACK"; the "ACK" message is caused by the receipt of the "REQ" message by station B. The network 10 is used to carry many of these REQ-ACK transactions.

Delay-determining apparatus 11 is attached to the network at Station A. This apparatus comprises a load-measuring probe portion 12 and an offset determination portion 13.

The probe portion 12 comprises a network interface 14, a message filter 15, first and second message counters 16 and 17, and an interval timer 18. The network interface receives all messages appearing on the part of the network to which the apparatus is attached. The filter 15 serves to identify the messages of interest, namely messages of type "REQ" passing from station A to B (category X messages) and messages of types "ACK" passing from station B to A (category Y messages).

Counter 16 counts category X messages and counter 17 counts category Y messages. These counts are repeatedly carried out over predetermined time intervals set by the interval timer 18.

Figure 2A:
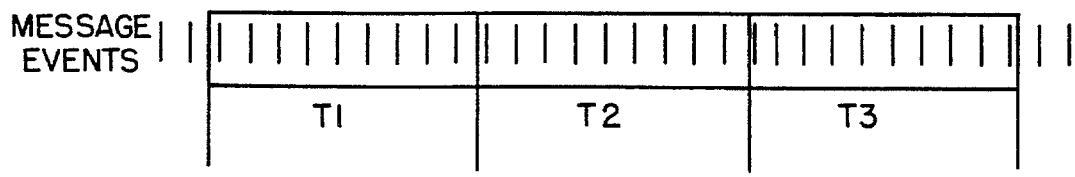
FIG. 2A is a diagram illustrating one method for obtaining network load measures by counting messages over fixed time intervals.
Figure 2B:
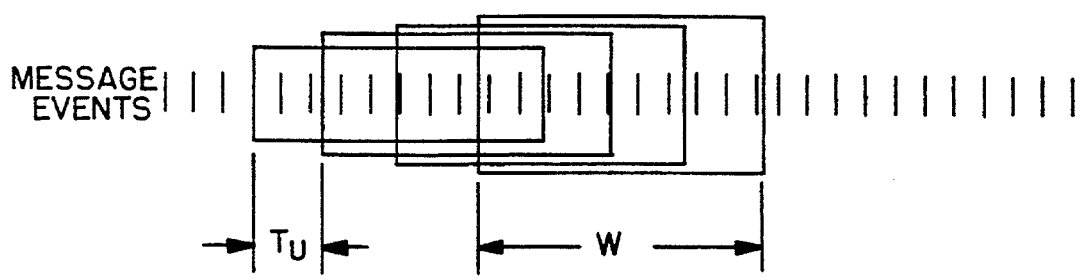
FIG. 2B is a diagram illustrating another method for obtaining network load measures by counting messages over a sliding window interval.

Two main methods are possible for effecting these counts. The most straightforward approach (see FIG. 2A) is to count the number of messages of the category concerned over a fixed time interval with successive counts being effected over contiguous, non-overlapping intervals T1, T2, T3. An alternative approach (see FIG. 2B) would be to use a sliding window technique, in which count value for a window period W was updated at intervals $T_U$ less than W, this updating being done by adding to the count value the number of relevant messages received in the latest interval $T_U$ and substracting the number of messages received in the oldest interval $T_U$ forming part of the previous window interval W. This latter approach requires a substantially more complex implementation of the counters 16 and 17 but is capable of giving more frequent count value updates.

Whatever approach is used to count the category X and Y messages, at each count update (for example, every minute), the count values held in counters 16 and 17 are output as load measures $L_X$ and $L_Y$ respectively for the loading of the network by the category X and Y messages.

Figure 3:
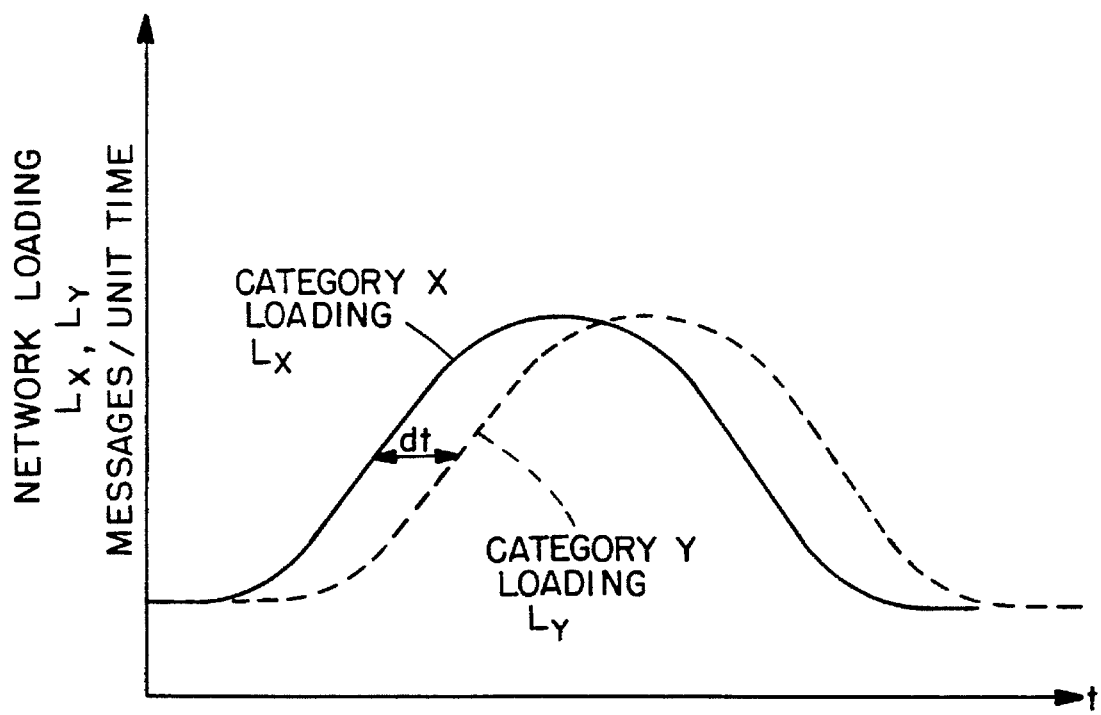
FIG. 3 is a time plot of the network loadings produced by "REQ" and "ACK" messages passed between stations A and B in FIG. 1.

FIG. 3 shows an example plot of the load measures $L_X$ and $L_Y$ over a period of time (such as one hour). The $L_X$ loading curve represents the fluctuation with time of REQ messages sent by station A, whilst the $L_Y$ loading curve represents the ACK messages sent back by station B. The form of curve $L_Y$ is similar to that for $L_X$ but lags the latter by a phase delay (or offset) dt that corresponds to the average interval between transmission of the REQ messages from station A to the receipt by that station of the response messages ACK from station B; in other words, the offset dt is a measure of the network delay, in round trip terms, between stations A and B (and including, of course, any processing delay in station B).

It will be appreciated that if the interval D between successive load measures is small compared with the offset dr, then the latter can be determined with a good degree of accuracy by measuring how long it takes the category Y loading curve to catch up to a load value previously noted for the category X loading curve (this assumes that the category X loading is not constant). If, however, the interval D between successive load measures approaches or is greater than the offset dt, then this approach is potentially highly inaccurate.

Nevertheless, as will now be explained with reference to FIG. 4, it is still possible to measure offsets dt that are similar in magnitude or smaller than the interval D between load measures.

Figure 4:
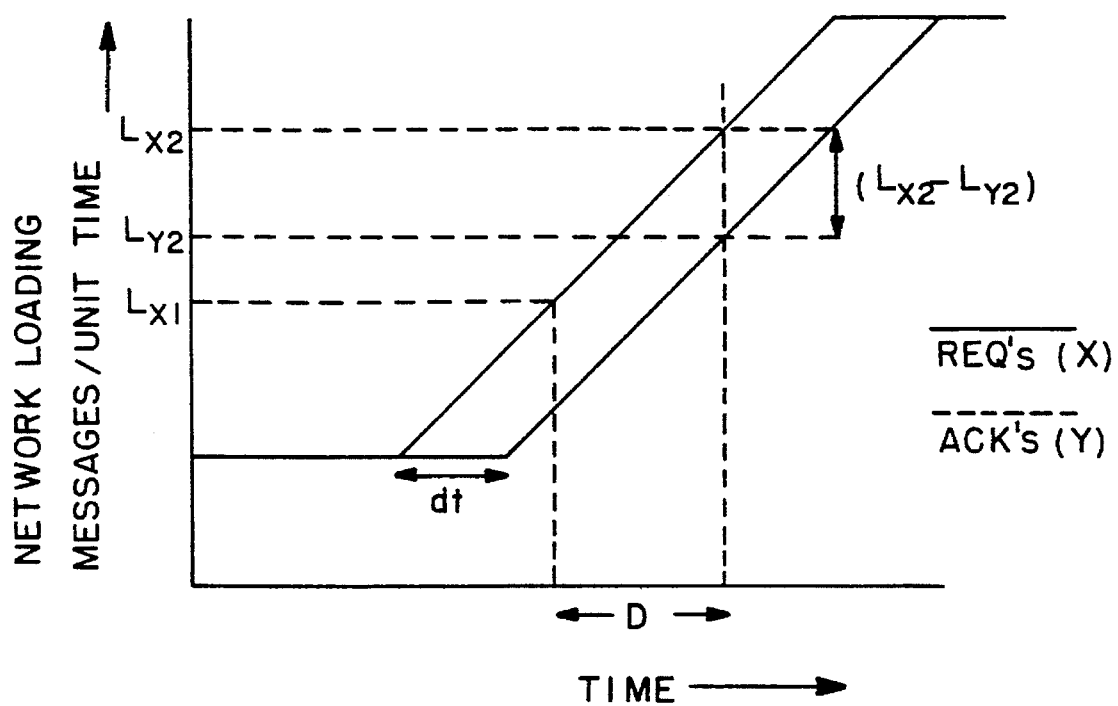
FIG. 4 is a diagrammatic timeplot of network loading illustrating one method of determining network delay from message load measures.

FIG. 4 shows linearised loading curves $L_X$, $L_Y$ for messages of categories X and Y respectively. The loading curves are offset from each other by offset dt but are otherwise identical; in particular the slope S of the two curves in the region where the loadings are increasing, are the same. If two successive load measures $L_{X1}$ and $L_{X2}$ for category X messages are separated by time D, then the slope S of the category Y loading curve is:

$$S = D/(L_{X2} - L_{X1}) \qquad (1)$$

Furthermore, if the category Y loading at the time that the $L_{X2}$ reading was derived, is $L_{Y2}$, then the slope of the category Y loading curve, which is also S, is given by:

$$S = dt/(L_{X2} - L_{Y2}) \qquad (2)$$

The value of the offset dt is then given by:

$$dt = D(L_{X2} - L_{Y2})/(L_{X2} - L_{X1}) \qquad (3)$$

It is thus possible to derive the offset dt directly using the load measures. Whilst the foregoing analysis is based on certain simplifications regarding the form of the loading curves, in practice, these simplifications prove to be acceptable.

By way of example of the numbers involved in using the above formula (3), if the number of "REQ" from station A to station B in FIG. 1 is increasing at a rate of 100 per second, then if the period D between load measures is one second, $(L_{X2} - L_{X1})$ will have a value of 100. If the offset dt is one second, then $(L_{X2} - L_{Y2})$ will also have a value of 100. Larger rates of increase will increase the count difference values. Smaller load-measure intervals D will reduce inaccuracy resulting from unsteady rates of increase. Thus, the larger the increase in traffic, the more accurate will be the measurement of the offset.

The determination of the offset value is carried out by the offset-determination portion 13 of the FIG. 1 apparatus 11.

The probe portion 12 can be arranged either to count all first and second messages or to sample the network messages randomly and only count first and second messages when found by such sampling; this latter approach will generally only be advantageous where there are high message loadings as may occur in LANs.

Figure 5:
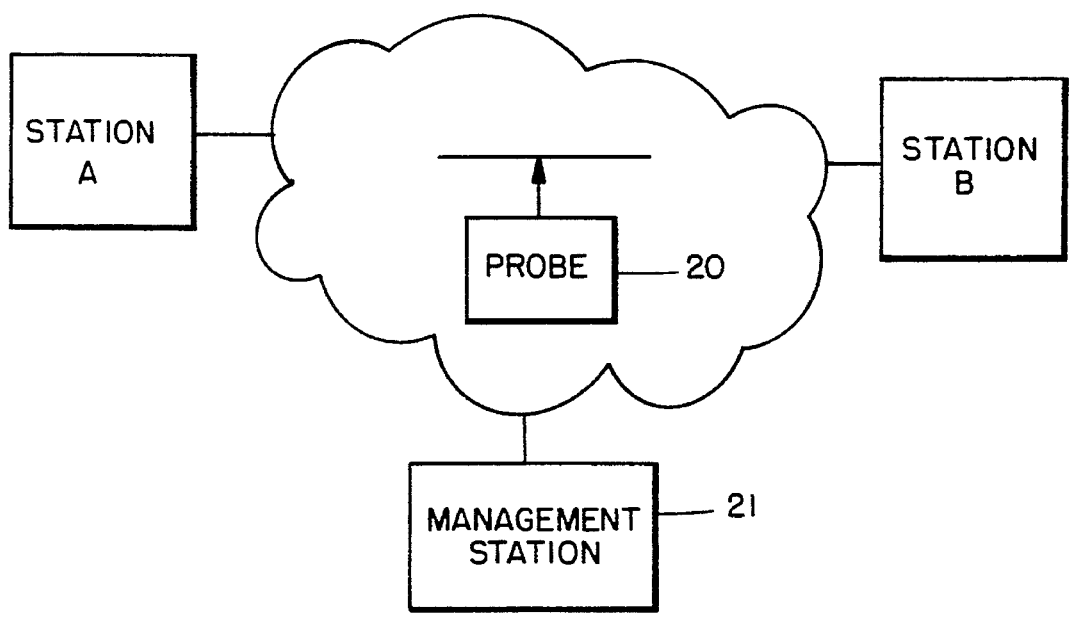
FIG. 5 is a diagram showing a form of the delay-determining apparatus in which a probe sends load measures to a remote management station.

Although in FIG. 1 the probe portion 12 and the offset-determination portion 13 of the apparatus are shown co-located, in many cases the probe portion 12 will be implemented as a discrete monitoring probe such as illustrated at 20 in FIG. 5. In this case, the offset-determination portion will normally be located at a management station 21 connected to the network, the probe 20 then communicating the load measures as they are generated to the station 21 via the network 10.

Furthermore, the probe 20 may be located anywhere in the network for measuring delays as seen at that location. Of course, it is important to ensure that the message categories being monitored are appropriate for the delay it is wished to determine.

It will be appreciated that a number of probes 20 may be distributed throughout the network, all reporting back to the same management station.

Rather than relying on passive monitoring of messages placed on the network by other entities, it is possible to arrange for the probe 20 to inject messages that require a target destination to effect a response. In this case, care must be taken when interpreting the resultant delay measurement to take account of the possibility that the messages produced by the probe may have affected the network response by causing processing overload, bandwidth limitations or similar effects.

The above-described delay measurement method will next be illustrated using an SS7 network and telephony as an example; the method can, of course, be applied equally well to other services supported by SS7 networks and to other message-based networks such as ATM networks and TCP/IP networks, subject to the limits on accuracy explained above.

Figure 6:
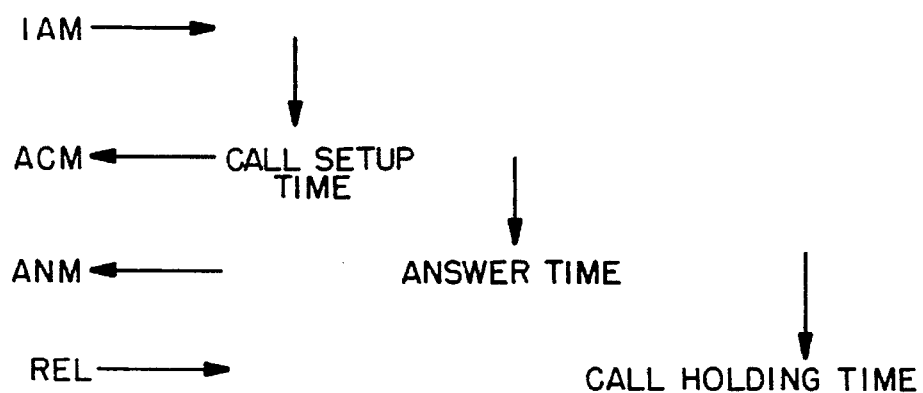
FIG. 6 is a diagram showing a typical SS7 sequence for a telephony call.
Figure 7:
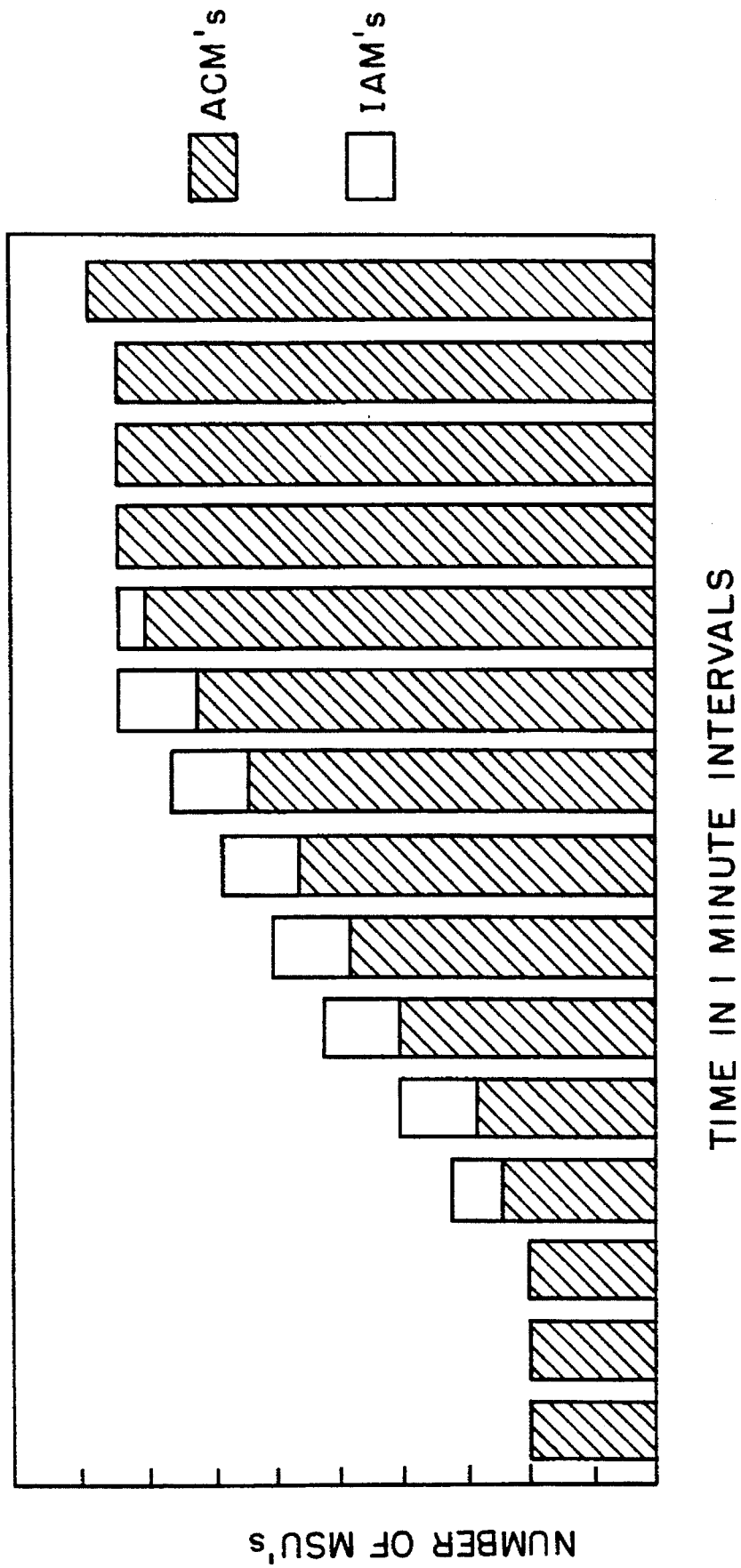
FIG. 7 is a typical network-loading timeplot for ACM and IAM message signalling units relating to telephony calls.

A normal successful telephone call setup over SS7 typically consists of the sequence of messages shown in FIG. 6, that is:

IAM—Initial-address message
ACM—Address-complete message
ANS—Answer message
REL—Release message The call setup time (an important network characteristic) is the time interval between the transmission of the IAM and reception of the ACM. Typically, this is in the order of 100–300 ms. As the network becomes busy, the delay increases. Consider the case of a call rate change of the order of 20 per second. For counts taken every minute and an average network delay of 2s between the IAM being sent and ACM returning there will be an additional gap of 40 between the minute totals. This behaviour is illustrated in exaggerated form in the graph shown in FIG. 7.

The time between call set up and answer time is in the order of seconds to a minute. Steady call rate changes of the order of 1 per second will reveal an average network answer response time of 10 seconds with a gap of 10 between the minute totals of IAM and ANS messages.

The call holding time can vary from seconds to minutes averaging around 3 minutes for telephony. Steady call rate changes of the order of 1 per second will produce a difference of 180 between the number of IAM's and REL's. For long average holding times (hours), the delay could be determined directly as explained above.

I claim:

1. A method of determining delays in a network carrying messages between entities connected to the network, said messages including first messages and second messages of respective predetermined categories, the first and second messages each producing a respective time-dependent loading of the network and said second messages being caused by the first messages whereby said loadings vary in a similar manner with time but with the loading produced by the second messages being offset from that produced by the first messages; the method comprising the steps of:

(a) deriving network load measures for said first and second messages at a predetermined location in said network, each said load measure being derived by counting at said location the number of messages of the category concerned occurring in a predetermined time interval; and (b) utilising said load measures to determine an offset between the network loadings produced by the first and second messages, this offset providing a network-delay measurement at said predetermined location.

2. A method according to claim 1, wherein step (a) involves deriving first and second load measures $L_{X1}$, $L_{X2}$ for the first messages respectively at first and second times separated by a time interval D, and deriving a load measure $L_{Y2}$ for the second messages at said second time; step (b) involving determining said offset according to the following formula:

$$Offset = D(L_{X2} - L_{Y2})/(L_{X2} - L_{X1}).$$

3. A method according to claim 1, wherein step (a) involves deriving said load measure for said first messages at a start time, and thereafter deriving a series of load measures for said second messages; step (b) involving determining an end time when the loading produced by said second messages as determined from said load measures derived in respect thereof, corresponds to the loading produced by said first messages at said start time as indicated by the said load measure taken for the first messages at the start time, step (b) further involving determining said offset by determining the time interval between said start and end times.

4. A method according to claim 1, wherein said messages include message type information and addressing information, the categories of said first and second messages being characterised by said message type and addressing information.

5. A method according to claim 1, wherein in step (a) said load measures for said first and second messages are repeatedly derived, said offset being determined in step (c) at regular intervals from the most recent load measures.

6. A method according to claim 1, wherein in step (a) each said load measure is derived by counting the number of messages of the category concerned occurring in a fixed update interval constituting said predetermined time interval, load measures for messages of the same category being carried out over non-overlapping intervals.

7. A method according to claim 1, wherein in step (a) each said load measure is derived by counting the number of messages of the category concerned occurring in a fixed measurement window constituting said predetermined time interval, successive load measures for messages of the same category being determined at fixed update intervals less than said measurement window.

8. A method according to claim 1, wherein the load measures derived in step (a) are derived at said predetermined location and then communicated to a remote management station where step (b) is performed.

9. A method according to claim 1, wherein said network is an SS7 signalling network, said first and second messages respectively comprising initial address messages (IAM) and address complete messages (ACM), said IAM and ACM messages being associated with the same network entities.

10. A method according to claim 1, comprising an initial step of placing said first messages onto the network at said location, each said load measure derived in step (a) for the first messages being derived by counting the number of such messages placed on the network in a predetermined time interval, and the or each load measure for the second messages being derived by monitoring the network at said predetermined location and counting the number of second messages that are detected on the network in a predetermined time interval.

11. A method according to claim 1, wherein in step (a) each said load measure is derived by monitoring the network at said predetermined location and counting the number of messages of the category concerned that are detected in a predetermined time interval.

12. Apparatus for determining delays in a network carrying messages between entities connected to the network, said messages including first messages and second messages of respective predetermined categories, the first and second messages each producing a respective time-dependent loading of the network and said second messages being caused by the first messages whereby said loadings vary in a similar manner with time but with the loading produced by the second messages being offset from that produced by the first messages; the apparatus comprising:

load measuring means for deriving load measures for said first and second messages at a predetermined location in said network, each said load measure being derived by counting the number of messages of the category concerned occurring in a predetermined time interval; and offset determining means for utilising said load measures to determine an offset between the network loadings produced by the first and second messages, this offset providing a network-delay measurement at said predetermined location.

13. Apparatus according to claim 12, wherein said load measuring means includes network monitoring means for monitoring the network to detect said first and second messages, the message categories associated with said first and second messages being characterised by the message type and the message addressing information, and the network monitoring means including filtering means responsive to the message type and addressing information of messages on said network, to selectively detect said first and second messages.

14. Apparatus according to claim 12, wherein said load measuring means are incorporated into a network monitoring probe intended to be disposed at said location, the load measuring means being operative to determine load measures for said first and second messages at regular intervals and the monitor probe including reporting means for reporting said load measures to a remote management station comprising said offset determining means.

15. Apparatus according to claim 12, wherein said load measuring means is operative to derive first and second load measures $L_{X1}$, $L_{X2}$ for the first messages respectively at first and second times separated by a time interval D, and to derive a load measure $L_{Y2}$ for the second messages at said second time; said offset determining means being operative to determine said offset according to the following formula:

$$Offset = D(L_{X2} - L_{Y2})/(L_{X2} - L_{X1}).$$

\* \* \* \* \*